(12) United States Patent
McCann

(10) Patent No.: US 8,783,053 B2
(45) Date of Patent: Jul. 22, 2014

(54) COOLING SYSTEM

(75) Inventor: Neil McCann, Edmonton (CA)

(73) Assignee: McNNNAC Energy Services Inc., Edmonton (CA)

( * ) Notice: Subject to any disclaimer, the term of this patent is extended or adjusted under 35 U.S.C. 154(b) by 1283 days.

(21) Appl. No.: 12/599,007

(22) PCT Filed: May 7, 2008

(86) PCT No.: PCT/CA2008/000872
§ 371 (c)(1),
(2), (4) Date: Mar. 19, 2010

(87) PCT Pub. No.: WO2008/138112
PCT Pub. Date: Nov. 20, 2008

(65) Prior Publication Data
US 2010/0181062 A1  Jul. 22, 2010

Related U.S. Application Data

(60) Provisional application No. 60/916,983, filed on May 9, 2007.

(51) Int. Cl.
*F25D 23/00* (2006.01)
(52) U.S. Cl.
USPC ............... 62/259.4; 62/335; 62/310; 62/314; 261/146
(58) Field of Classification Search
CPC ........................................................ F28D 5/00
USPC ......... 62/259.4, 310, 426, 506–507; 261/146, 261/147, 149
See application file for complete search history.

(56) References Cited

U.S. PATENT DOCUMENTS

| 2,005,276 | A | 6/1935 | Tidmarsh et al. |
| 2,018,453 | A | 10/1935 | Lawler |
| 2,030,032 | A | 2/1936 | Keyes |
| 2,048,661 | A | 7/1936 | Lawler |
| 2,858,677 | A | 11/1958 | Stone |
| 3,850,007 | A | 11/1974 | McFarlan |
| 4,010,624 | A | 3/1977 | McFarlan |
| 4,313,310 | A | 2/1982 | Kobayashi et al. |
| 4,315,873 | A | 2/1982 | Smith et al. |
| 4,380,910 | A | 4/1983 | Hood et al. |
| 4,538,426 | A | 9/1985 | Bock |
| 4,660,390 | A | 4/1987 | Worthington |
| 4,720,984 | A | 1/1988 | Ames |
| 4,827,733 | A | 5/1989 | Dinh |
| 4,857,090 | A | 8/1989 | Hartness |

(Continued)

FOREIGN PATENT DOCUMENTS

| CA | 2300234 | 9/2000 |
| CA | 2400149 | 8/2001 |
| EP | 1698847 | 9/2006 |
| WO | 2005103578 | 11/2005 |

*Primary Examiner* — Cassey D Bauer
(74) *Attorney, Agent, or Firm* — Bennett Jones LLP

(57) ABSTRACT

An evaporative cooling system that can be used to cool fluid and to cool an air supply to a building. The air supply to a cooling tower in a first evaporative system also having a fluid pump and a heat exchange element is cooled by the heat exchange element of a second evaporative cooling system. As a result, the inlet air wet bulb temperature of the primary cooling tower will be reduced, enhancing the cooling capacity of the primary cooling tower.

14 Claims, 7 Drawing Sheets

(56) References Cited

U.S. PATENT DOCUMENTS

| | | |
|---|---|---|
| 4,926,656 A | 5/1990 | Hickley et al. |
| 5,076,065 A | 12/1991 | Brogan |
| 5,408,838 A * | 4/1995 | Yaeger et al. .................... 62/92 |
| 5,411,078 A | 5/1995 | Ares |
| 5,692,384 A | 12/1997 | Layton |
| 5,778,683 A | 7/1998 | Drees et al. |
| 6,385,987 B2 * | 5/2002 | Schlom et al. .................. 62/304 |

* cited by examiner (Cross Flow)

(Counterflow)

COOLING SYSTEM

CROSS REFERENCE TO RELATED APPLICATIONS

This application is the National Phase of International Application No. PCT/CA2008/000872, filed May 7, 2008, which claims the priority benefit of U.S. Provisional Patent Application No. 60/916,983 filed on May 9, 2007, the contents of which are incorporated herein by reference.

FIELD OF THE INVENTION

The present invention relates to a system for cooling fluid, and in particular to a system for cooling an air supply to a residential or commercial building using such cooled fluid.

BACKGROUND

Conventional chiller units are commonly used to cool the air supply to a building. In a compression type conventional chiller, vaporized refrigerant is compressed in a compressor which causes the refrigerant to heat up. The hot gas is directed to the condenser where the refrigerant is cooled and condenses. Typically the condenser is cooled by water or air. Many such chiller systems utilize cooling towers to provide a supply of cooled water to the condenser to absorb rejected heat. The liquid refrigerant from the condenser passes through an expansion valve into the evaporator. As the fluid passes through the expansion valve, the pressure of the refrigerant is reduced causing vaporization of the liquid, which results in a large reduction in temperature. The cold refrigerant in an evaporator is used to cool a separate circulatory water system (or any other suitable fluid).

The water cooled by the chiller is then pumped to a heat exchanger that is positioned in the flow of the air supply to be cooled. The air passing over the heat exchanger is cooled and is then directed to the various spaces within the building that require cooling. The warmed water exiting the heat exchanger is redirected to the chiller to be cooled again. Conventional chiller units can quickly cool the interior of a structure, but they consume large quantities of electricity, particularly when ambient temperature and humidity are high.

Another type of conventional chiller system commonly used employs an absorptive refrigeration system. This type of system utilizes a heat source to provide the energy needed to drive the cooling system rather than being dependent on electricity to run a compressor as with the chiller system described previously. Absorptive refrigerators are popular in situations where electricity is unreliable, costly, or unavailable, where noise from the compressor is problematic, or where surplus heat is readily available. A widely used gas absorption refrigerator system cools by evaporating liquid ammonia in a hydrogen environment. The gaseous ammonia is then dissolved into water, and then later separated from the water using a source of heat. This drives off the dissolved ammonia gas which is then condensed into a liquid. The liquid ammonia then enters the hydrogen-charged evaporator to repeat the cycle. Other types of systems are also used.

Conventional refrigerant based cooling systems, often referred to as DX (Direct Expansion) systems, are also employed to cool the air supply to buildings. A DX system operates identically to a chiller, with the exception that the evaporator is used to cool an air stream directly (there is no chilled water loop). The condenser of a DX system is also typically air cooled. Like conventional chiller units, DX systems can quickly cool the interior of a structure, but they consume large quantities of electricity, particularly when ambient temperature and humidity are high.

In areas of the world having suitable climatic conditions evaporative coolers are used as an alternative to conventional chillers or DX systems to cool the air supply to residential and commercial buildings. The use of evaporative coolers is a desirable method of cooling air because of their relatively low installation cost, their relatively lower maintenance costs, and their relatively low cost of operation in comparison with conventional chiller units and DX systems. Because evaporative coolers use the latent heat of evaporation to cool process water, such evaporative systems do have some operational limitations and disadvantages. In particular, the cooling effectiveness of an evaporative cooler is dependent on the ambient wet bulb temperature and is greatly reduced as the temperature or humidity, or both, of the ambient air increases. This means that the use of evaporative coolers is limited on days when hot and humid conditions are being experienced, and is impractical in regions experiencing prolonged periods of hot and humid weather. Evaporative cooling units are usually not able to cool a fluid to a temperature less than the wet bulb temperature of the ambient air.

Therefore, there is a need in the art for an evaporative cooling system that can be used alone, or in an assistive manner with a conventional chiller, or with a DX system, that mitigates some of the limitations of existing evaporative systems. It would also be preferable if the new evaporative cooling system had a greater cooling capacity than existing evaporative cooling systems during humid conditions.

SUMMARY OF THE INVENTION

The present invention is directed to a system for cooling fluid and in particular to a system for cooling an air supply to a residential or commercial building using such cooled fluid. The present invention is also directed to a method of enhancing the cooling capability of a cooling tower. The systems of the present invention may also be used to cool substances in an industrial context.

In one aspect of the present invention, it comprises a system for cooling a primary air supply having:
(a) a first evaporative cooling system comprising;
   (i) means for circulating fluid through the first system;
   (ii) a primary heat exchange element and a primary cooling tower, the primary cooling tower having an air supply and being operatively connected to the primary heat exchange element;
(b) means for selectively forcing the primary air supply over the primary heat exchange element;
(c) a second evaporative cooling system comprising;
   (i) means for circulating fluid through the second system;
   (ii) a second heat exchange element and a second cooling tower, the second cooling tower having an air supply and being operatively connected to the second heat exchange element; and
(d) means for selectively forcing the air supply to the primary cooling tower over the second heat exchange element such that the air supply to the primary cooling tower has a lower wet bulb temperature than the ambient air.

In one embodiment, the means for selectively forcing the primary air supply over the primary heat exchange element comprises a duct and at least one fan. In one embodiment such means further comprises a bypass louver. In one embodiment, the means for circulating fluid through the first system and the means for circulating fluid through the second system comprises at least one fluid pump. In an embodiment, the heat exchange elements comprise finned cooling coils. In one embodiment, the system further comprises an additional heat exchange element proximate to the primary heat exchange element, the additional heat exchange element being connected to a conventional chiller. In another embodiment, the system further comprises an additional heat exchange element proximate to the primary heat exchange element, the additional heat exchange element being connected to a DX system.

In one embodiment the system also has a third evaporative cooling system comprising;
  (i) means for circulating fluid through the third system;
  (ii) a third heat exchange element and a third cooling tower, the third cooling tower having an air supply and being operatively connected to the third heat exchange element; and
  (iii) means for selectively forcing the air supply to the second cooling tower over the third heat exchange element such that the air supply to the second cooling tower has a lower wet bulb temperature than the ambient air.

In one embodiment, the system further comprises means for activating and deactivating each cooling tower and each means for circulating fluid. In another embodiment, the activation and deactivation means is automated and is responsive to changes in cooling requirements, ambient air temperature, or changes in cooling requirements and ambient air temperature.

In one embodiment the system for cooling a primary air supply further comprises:
  (a) a fourth evaporative cooling system comprising;
    (i) means for circulating fluid through the fourth system;
    (ii) a fourth heat exchange element and a fourth cooling tower, the fourth cooling tower having an air supply and being operatively connected to the fourth heat exchange element; and
  (b) means for selectively forcing the air supply to the third cooling tower over the fourth heat exchange element such that the air supply to the third cooling tower has a lower wet bulb temperature than the ambient air.

In one embodiment the system further comprises an additional heat exchange element proximate to the primary heat exchange element, the additional heat exchange element being connected to a conventional chiller or to the evaporator of a DX system.

In another aspect of the present invention, the invention comprises a system for cooling a fluid comprising;
  (a) a plurality of evaporative cooling systems, each such system comprising;
    (i) means for circulating fluid through the system;
    (ii) a heat exchange element and a cooling tower, the cooling tower having an air supply and being operatively connected to the heat exchange element;
  (b) means for forcing the fluid over one of the heat exchange elements;
    wherein all but one of the cooling towers is supplied with air forced over the heat exchange element of another system such that the air supply to each such cooling tower has a lower wet bulb temperature than the ambient air.

In another aspect of the present invention, the invention comprises a method of enhancing the cooling capability of a cooling tower in a first evaporative cooling system by cooling the air supply to the cooling tower with a heat exchange element of a second separate evaporative cooling system.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

The present invention provides for a system for cooling fluid and in particular to a system for cooling an air supply to a residential or commercial building using such cooled fluid. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In this patent the following words are intended to have the following meaning:

1. "Conventional chiller" means any chiller unit commonly used with HVAC systems implementing vapor compression of a refrigerant (typically having a compressor, a condenser and an evaporator) or implementing an absorptive refrigeration system.

2. "DX system" means an air conditioning unit typically used in residential and smaller commercial buildings implementing vapor compression of a refrigerant, typically having a compressor, a condenser and an evaporator in direct contact with the air supply that requires cooling.

3. "Cooling tower" means a tower or other structure that incorporates an evaporative cooler, an evaporative cooler being a cooler that lowers the temperature of a water stream by exposing the water to unsaturated air, promoting evaporation. Evaporation consumes energy from the water stream, reducing the temperature of the water. This cooled water can be used directly (Open Circuit) or passed over an internal heat exchanger to cool a separate fluid stream (Closed Circuit). The term cooling tower as used herein is intended to include both cross flow and counter flow type cooling towers. In a crossflow design, the air flow is directed perpendicular to the water flow. In contrast, in a counterflow design, the air flow is directly opposite of the water flow. The term cooling tower as used herein also encompasses cooling towers having air flow generated by natural draft and mechanical draft including without limitation, induced draft, forced draft and fan assisted natural draft.

4. "Fluid" means water but also includes all other aqueous solutions or gases commonly used in evaporative cooling systems. The terms 'fluid' and 'water' are used interchangeably in the description of this application.

Figure 1:
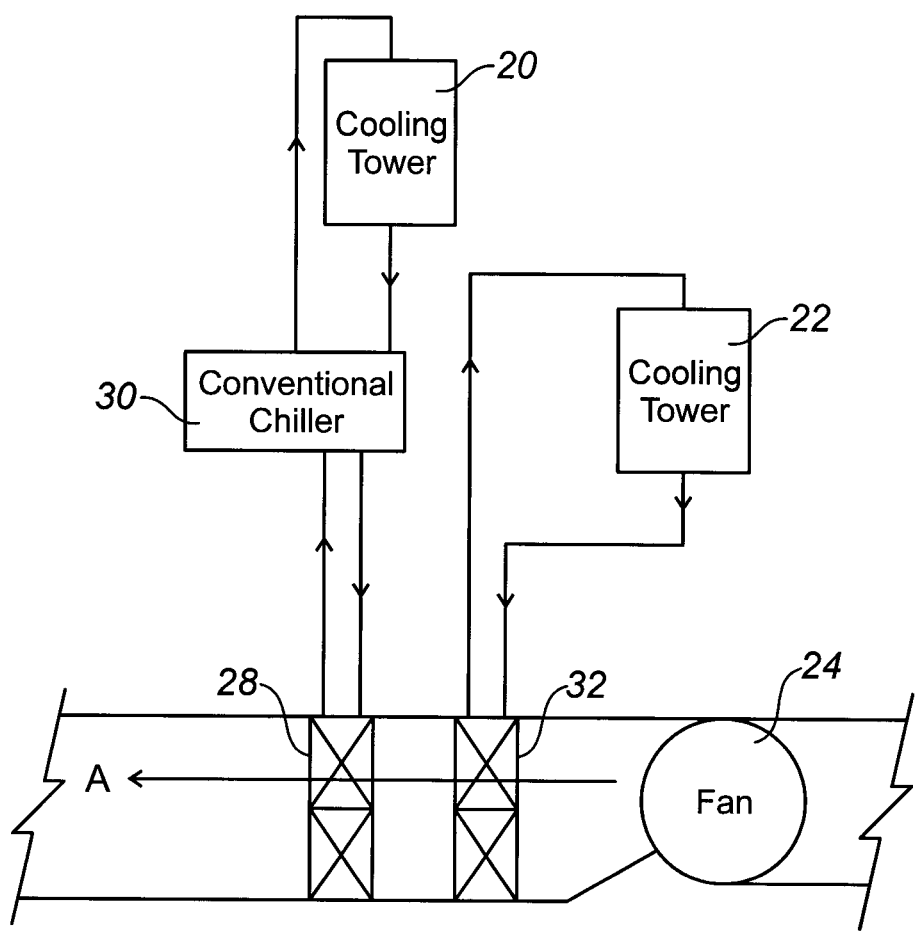
FIG. 1 is a diagrammatic depiction of one embodiment of the prior art.

5. "Wet bulb temperature" means the temperature measured by a thermometer whose bulb is covered by a muslin sleeve which is kept moist with distilled and clean water, freely exposed to the air and free from radiation. At relative humidities below 100%, water evaporates from the bulb which cools the bulb below ambient temperature. To determine relative humidity, ambient temperature is measured using an ordinary thermometer, known as a dry-bulb thermometer. At any given ambient temperature, less relative humidity results in a greater difference between the dry-bulb and wet-bulb temperatures; the wet bulb is colder. The precise relative humidity is determined by finding one's wet-bulb and dry-bulb temperatures on a psychrometric chart. The wet bulb temperature is dependant on the dry bulb temperature and the relative humidity. A decrease in dry bulb temperature (with the humidity ratio constant) will also decrease the wet bulb temperature, but not by the same magnitude The present invention is directed to a system for cooling fluid and in particular to an evaporative cooling system for cooling an air supply to a residential or commercial building using such cooled fluid. FIG. 1 depicts a prior art evaporative cooling system. The system is comprised of a conventional chiller (30) connected to a cooling tower (20). The purpose of the cooling tower (20) connected to the chiller (30) is to provide a source of cooled water to the conventional chiller (30) to assist with the cooling of the refrigerant gases used therein, and to absorb reject heat gained from the compression of the refrigerant gas used in the chiller. The chiller (30) delivers chilled fluid to the connected heat exchange element (28). A second heat exchange element (32) forms part of an evaporative cooling system (23) and is connected to a cooling tower (22). The heat exchange elements (28, 32) are disposed in the flow of the primary air supply (A). A fan (24) draws the primary air supply. When conditions in the building and external environment are such that the air supply does not require cooling, the cooling towers (20, 22) and the conventional chiller (30) are inoperative. If the need for cooling arises, the cooling tower (22) in the evaporative system is activated and cooled fluid is circulated through the evaporative cooling system to the heat exchange element (32) and back to the cooling tower (22). The air-flow (A) passes over the heat exchange element (32) and is cooled. If the cooling tower (22) and associated heat exchange element (32) cannot cool the air sufficiently, then the conventional chiller (30) and the first cooling tower (20) are activated and chilled fluid is also circulated through the associated heat exchange element (28). As cooling requirements are reduced, the conventional chiller (30) can be deactivated. On days where the wet bulb temperature exceeds a desired level, the efficiency of the second cooling tower (22) may be so impaired that the conventional chiller is run alone to cool the primary air supply. In an alternate prior art embodiment, the cooling tower (20) connected to the chiller (30) may have the means to bypass the conventional chiller (30) supplying cooled water directly to the heat exchange element (28) until the cooling requirements exceed the evaporative cooling systems capacity thereby activating the conventional chiller (30) and diverting the water flow from the first cooling tower to assist the conventional chiller (30). It can be understood that these prior evaporative cooling systems are limited to the capability of the cooling towers (20 and 22) to supply cool water to the heat exchange element. On certain days, especially when there is high ambient humidity, the wet bulb temperature rises, greatly reducing the ability of the stand alone cooling tower to supply water cold enough to sufficiently cool the air supply. In such circumstances, the conventional chiller must be relied upon heavily which is costly due to the consumption of large amounts of energy.

Figure 2:
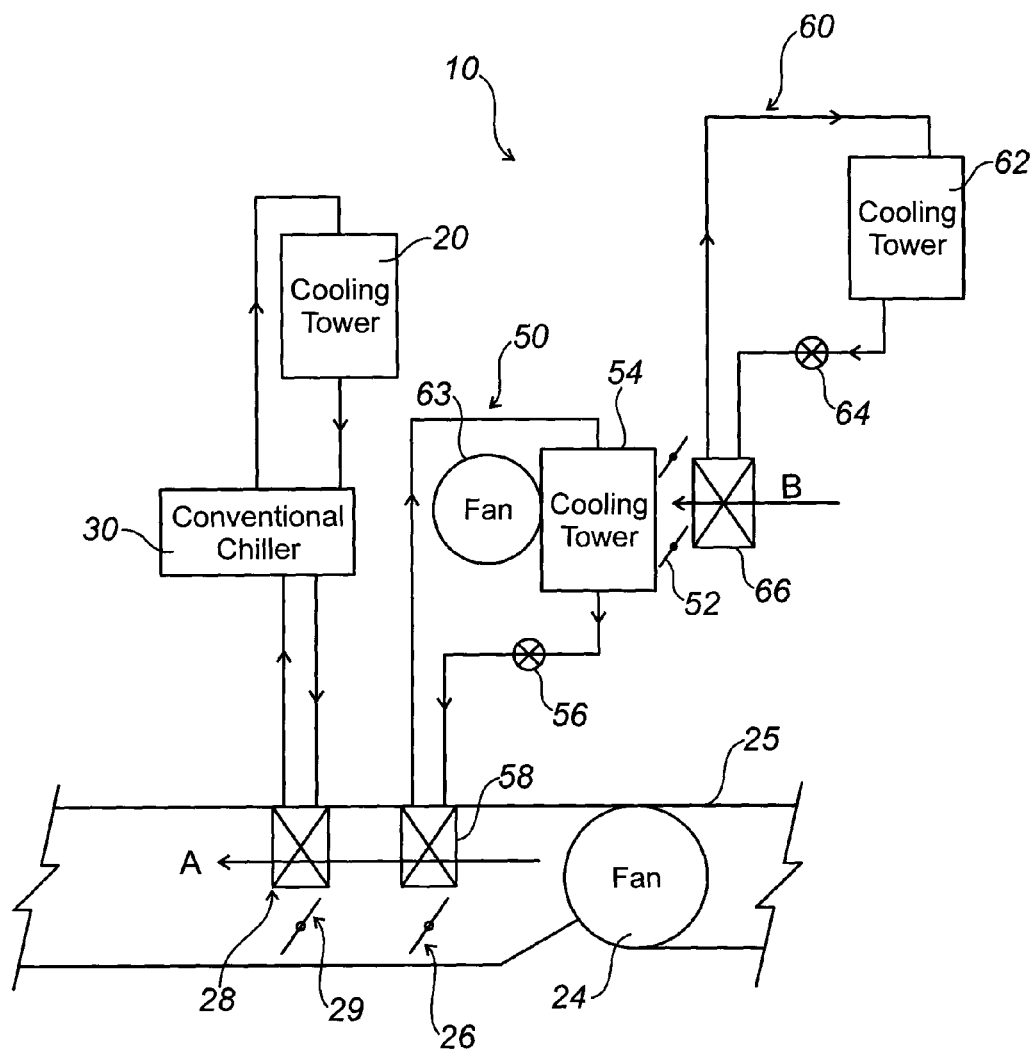
FIG. 2 is a diagrammatic depiction of one embodiment of the present invention showing use in conjunction with a conventional chiller.
Figure 3:
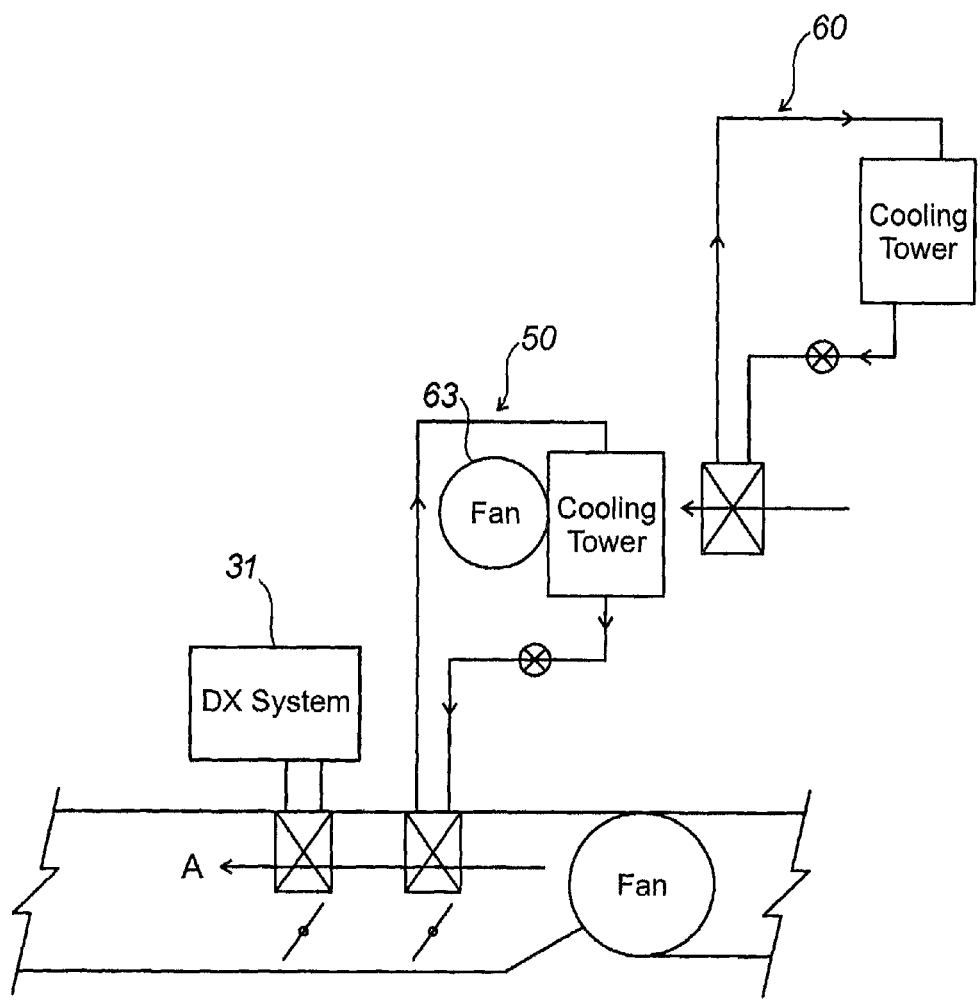
FIG. 3 is a diagrammatic depiction of one embodiment of the present invention showing use in conjunction with a DX system.

The system of the present invention (10) is able to provide a steady supply of cold water to the heat exchange element, even on humid days. Thus, the conventional chiller is required less and a reduction in electricity to cool the air supply is possible. As shown in FIG. 2, the present invention (10) may be used in conjunction with a conventional chiller (30). As shown in FIG. 3, the present invention (10) may also be used in conjunction with a DX System (31). However, it should be understood that it could be used alone without a conventional chiller or DX system if the ambient conditions of the subject building location are suitable.

As seen in FIG. 2, the invention has a first evaporative cooling system (50). The first evaporative cooling system (50) has a means for circulating fluid (56) which may comprise any suitable pump as may be selected by one skilled in the art including without limitation centrifugal pumps. The first evaporative cooling system (50) has a primary heat exchange element (58) positioned in the primary air supply flow (A). The primary heat exchange element (58) and all heat exchange elements described herein, may comprise any suitable heat exchanger having an arrangement of finned coils and may be constructed from any suitable materials including copper and aluminum. The primary air supply may be comprised entirely of external air, entirely of return air, or of a mixture of both. The means for forcing the air-flow (A) over the primary heat exchange element (58) is a combination of a fan (24) and a duct (25) and may also optionally include bypass louvers (26). The fan (24) can have modulated speeds to accommodate varying cooling requirements. If employed, the bypass louvers (26) may be opened and shut to divert air-flow (A) through the primary heat exchange element (58). First evaporative cooling system (50) has a primary cooling tower (54) connected to the heat exchange element (58). The primary cooling tower has an air supply (B). The primary cooling tower (54) cools the circulating fluid which flows to the primary exchange element (58). The primary cooling tower, and all cooling towers referenced herein, may comprise any suitable cooling tower as is commonly used in the relevant industry.

The system (10) relies on air circulation through the primary cooling tower (54) in combination with a pre-cooling evaporative process. The system (10) thus comprises a second evaporative cooling system (60) which like the first evaporative system (50), has a means for circulating fluid (64), a second cooling tower (62) and a second heat exchange element (66). The apparatus has means for selectively forcing the air supply (B) over the second heat exchange element (66) of the second evaporative cooling system (60). Such means may be a combination of a duct (not shown), a fan (63) and bypass louvers (52). The second closed circulatory fluid system is designed to cool the air supply (B) to the primary cooling tower (54). When the bypass louvers (52) are open, the air-flow (B) bypasses the second heat exchange element (66). When the bypass louvers (52) are closed, the air-flow (B) passes through the second heat exchange element (66). It can be understood that when the bypass louvers (52) are closed, and when the second cooling tower (62) is activated, the second heat exchange element (66) will pre-cool the air supply (B) to the primary cooling tower (54). As a result, the wet bulb temperature of the primary cooling tower will be reduced, enhancing the cooling capacity of the primary cooling tower.

Figure 4:
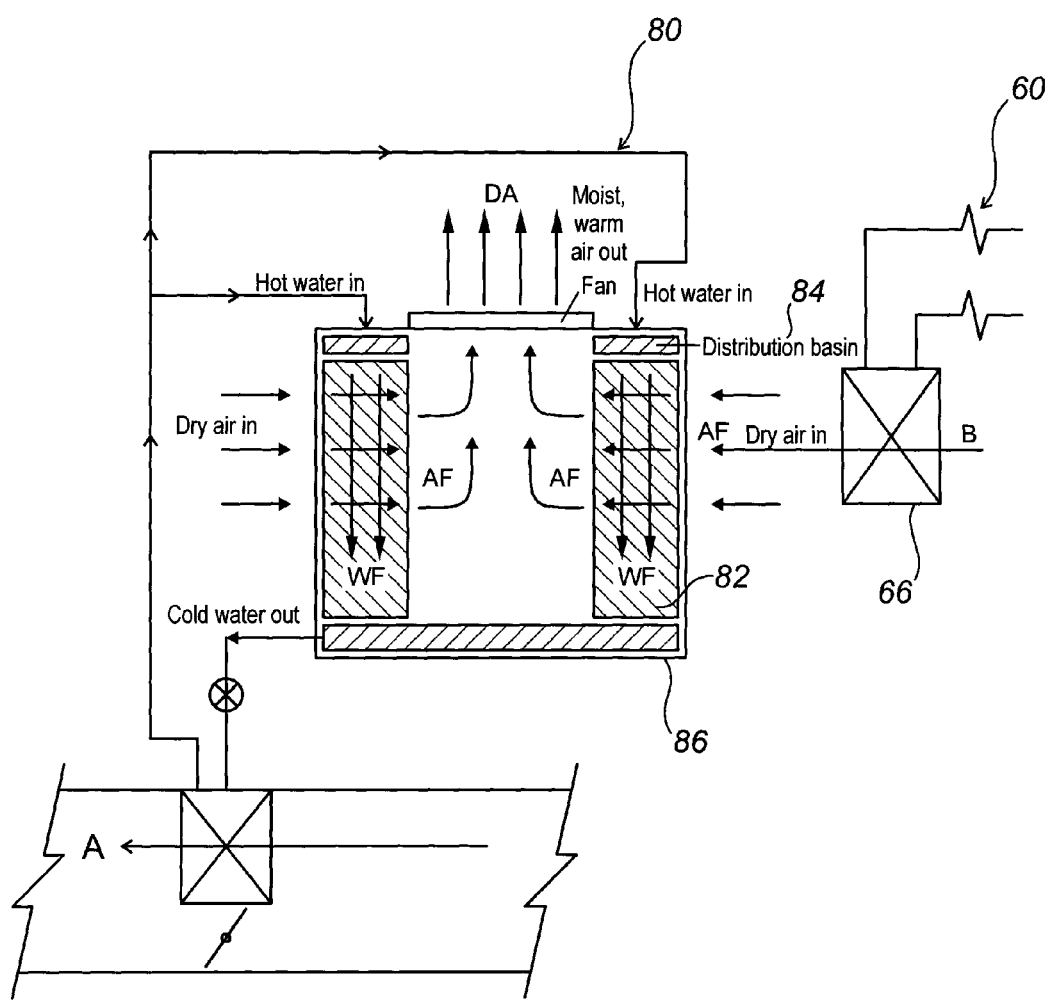
FIG. 4 is a diagrammatic depiction of one embodiment of the present invention showing use of a cross-flow design cooling tower.

FIG. 4 depicts a cross-flow cooling tower (80) being used in the present apparatus. Cross-flow is a design in which the air flow (AF) is directed perpendicular to the water flow (WF). Air flow (AF) enters one or more vertical faces of the cooling tower (80) to meet the fill material (82). Water flows (perpendicular to the air) through the fill material (82) by gravity. The air passes through the fill material (82) and thus past the water flow (WF) into an open plenum area. A distribution or hot water basin (84) consisting of a deep pan with holes or nozzles (not shown) in the bottom is utilized in a cross-flow tower. Gravity distributes the water through the nozzles uniformly across the fill material (82).

Figure 5:
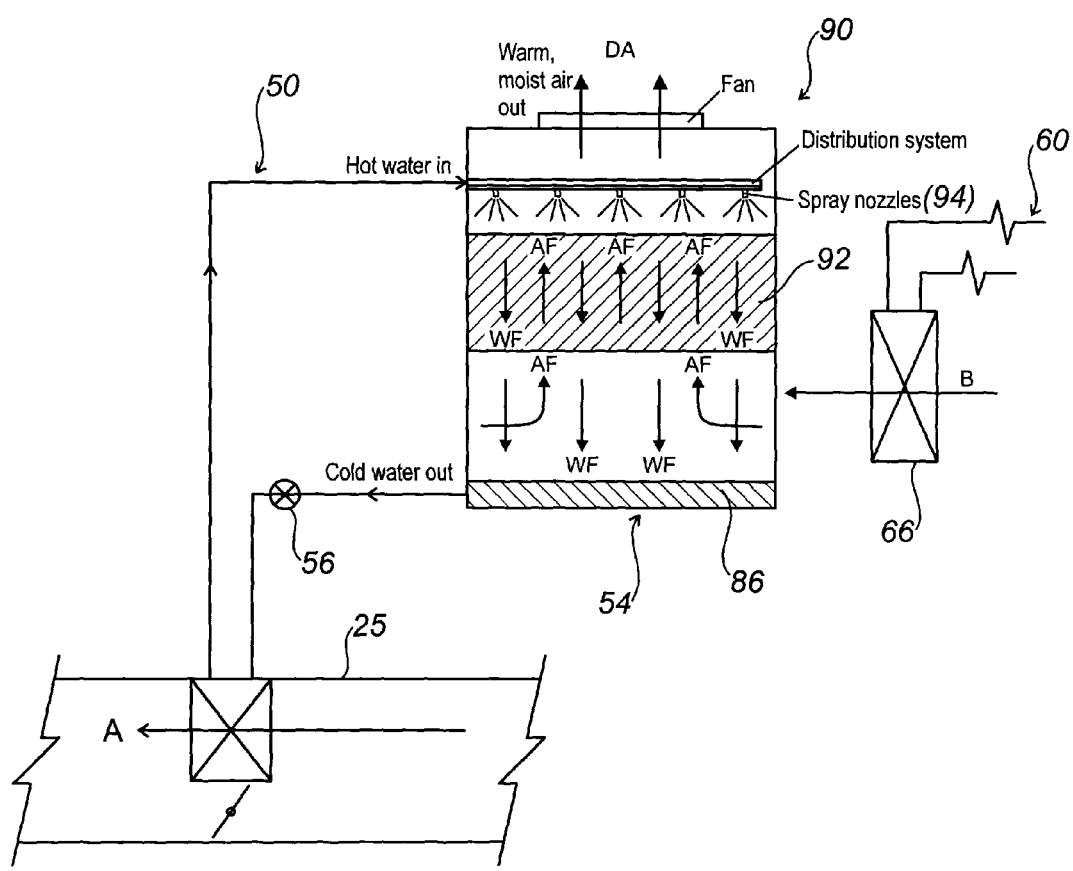
FIG. 5 is a diagrammatic depiction of one embodiment of the present invention showing use of a counter-flow design cooling tower.

FIG. 5 depicts a counter-flow cooling tower (90) being used in the present invention. In a counter-flow design the air flow (AF) is substantially opposite of the water flow (WF). Air flow first enters an open area beneath the fill media (92) and is then drawn up vertically. The water is sprayed through pressurized nozzles (94) and flows downward through the fill (92), opposite to the air flow (AF).

Although not shown in FIG. 4 or 5, it can be understood that if a cross-flow or counter-flow type cooling tower, or any other type of cooling tower being used to practice the present invention, has more than one air intake, the heat exchange element used to pre-cool the air supply to such cooling tower, and the intake ducting, will be configured to pre-cool the air supply for all such intakes.

In both cross-flow and counter-flow cooling towers the interaction of the air and water flow allow a partial equalization and evaporation of water and the air supply, now saturated with water vapor (DA), is discharged from the cooling tower. Further, in each type of cooling tower a sump or cold water basin (86) is used to contain the cooled water after its interaction with the air flow. Both cross-flow and counter-flow designs can be used in natural draft and mechanical draft, and hybrid draft cooling towers. For open loop cooling towers sump water is utilized directly. A closed loop cooling tower operates identically to the open loop tower except that an additional heat exchanger exists inside of the cooling tower. In a closed loop tower the evaporative cooled fluid flows across the heat exchanger and cools a second fluid stream.

It will be understood by one skilled in the art, that in accordance with standard practice, the evaporative cooling systems will be connected to a water source to replenish the volume of water lost through evaporation in the cooling tower. It will also be understood by one skilled in the art that some form of water treatment system and filtration system will be employed with the evaporative cooling systems to maintain the water quality and to minimize fouling or corrosion of system components.

Operation of one embodiment of the cooling system (10) will now be described having reference to FIG. 2. If no cooling of the primary air supply (A) is required, bypass louvers (26) are opened and the cooling towers (54, 62) are inactive. As the requirement for cooling arises, the primary cooling tower (54), the fluid pump (56) and fan (63) are activated. The bypass louvers (52) directing the air supply for the primary cooling tower (B) are open. Bypass louvers (26) are closed to divert primary air flow (A) over the primary heat exchange element (58). If the primary cooling tower (54) is unable to meet the cooling demands, then bypass louvers (52) are closed, and secondary cooling tower (62) and fluid pump (64) are activated. This results in a cooling of the air supply (B) to the primary cooling tower (54), which reduces the wet bulb temperature of the primary cooling tower, thereby increasing the cooling capacity of the primary cooling tower (54). If the primary and secondary cooling towers in combination cannot meet the cooling demands, then the conventional chiller (30) may be activated and the relevant bypass louvers (29) closed thereby forcing the primary air supply flow (A) over heat exchange element (28). The first (50) and second (60) evaporative cooling systems may be controlled by an automated activation and deactivation means that is responsive to cooling demands and system output and to ambient temperatures. In general terms, any suitable electronic sensory feed-back system may be utilized as would be selected by one skilled in the art. Such activation and deactivation means may be controlled by a central computer processor that is adapted to receive and interpret sensory data regarding system output, cooling demands and ambient conditions.

Figure 6:
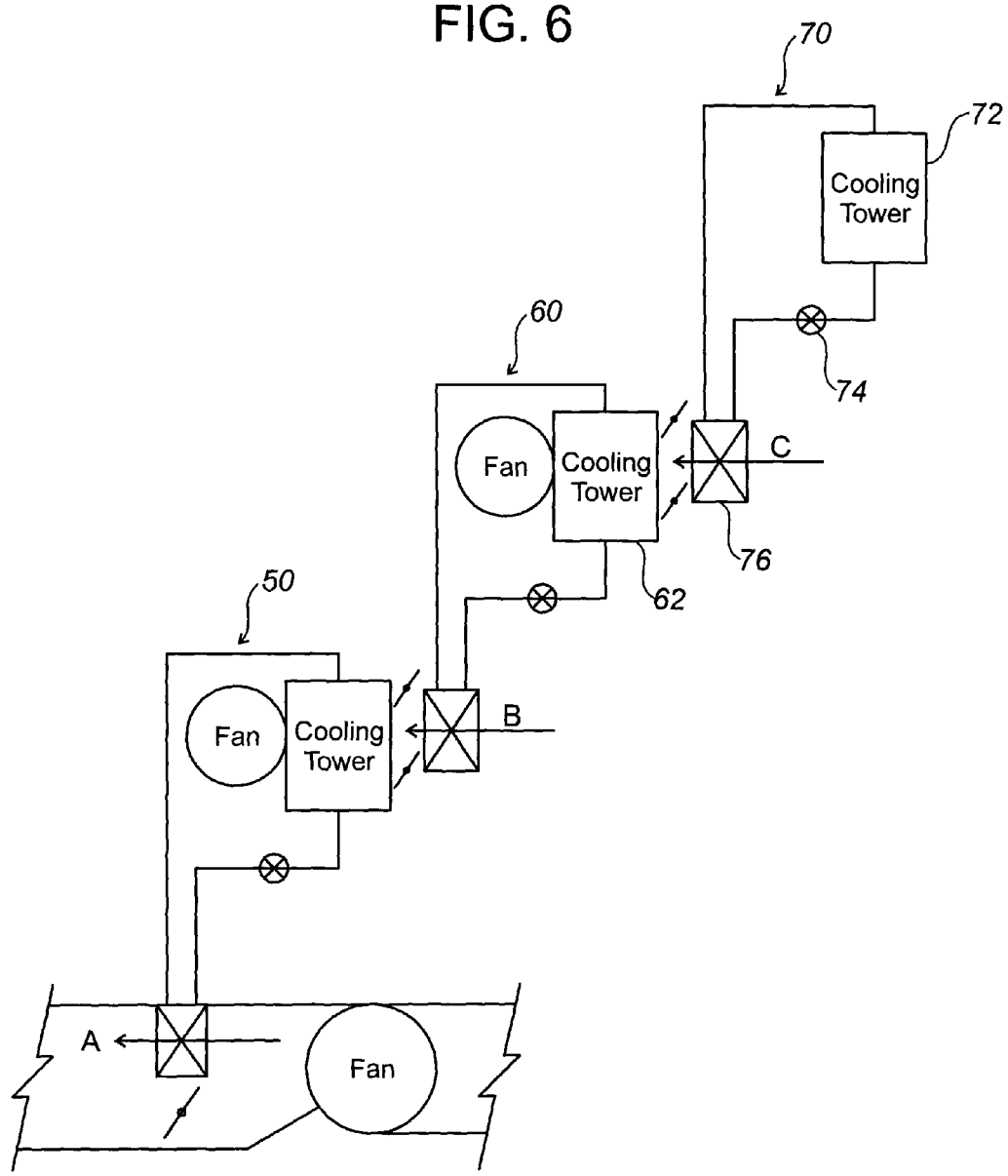
FIG. 6 is a diagrammatic depiction of one embodiment of the present invention having a plurality of evaporative cooling systems.

As shown in FIG. 6, a third evaporative cooling system (70) having a third cooling tower (72) and a third fluid pump (74) and a third heat exchange element (76) may also be added in a like manner to the apparatus (10) to cool the air supply (C) to the second cooling tower (62). Furthermore, it can be understood that fourth and maybe fifth evaporative cooling systems may also be added with each such additional system being designed to cool the air supply to the cooling tower of the preceding evaporative cooling system. It can be understood that if a plurality of such staged evaporative cooling systems are used, they may be activated sequentially as the cooling demands are increased.

Figure 7:
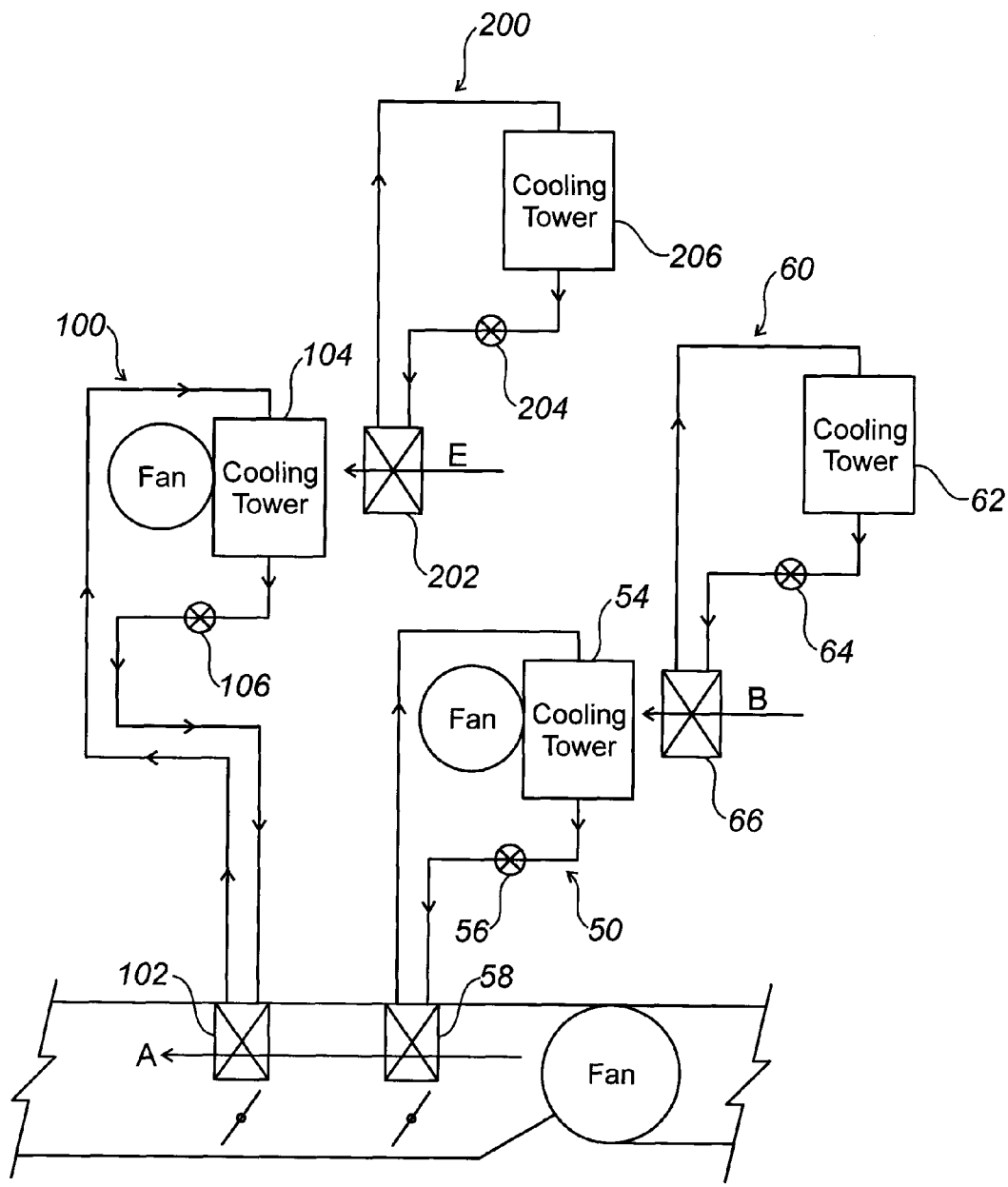
FIG. 7 is a diagrammatic depiction of one embodiment of the present invention showing the use of two separate systems.

As shown in FIG. 7, more than one system may be employed to cool air such that there are more than one heat exchange elements connected to evaporative cooling systems positioned in the primary air-flow. As shown in FIG. 7, a there is a first heat exchange element (58) exposed to air flow A. The first heat exchange element (58) is part of a first evaporative cooling system (50), also having a first cooling tower (54) and a first fluid pump (56). The first cooling tower has an air supply (13) cooled by a second evaporative cooling system (60). The second evaporative cooling system (60) has a second cooling tower (62), a second fluid pump (64) and a second heat exchange element (66). There is a third heat exchange element (102) that is exposed to the air-flow (A). The third heat exchange element (102) is part of a third evaporative cooling system (100) having a third cooling tower (104) and a third fluid pump (106). The air supply (E) for the third cooling tower (104) is cooled by a fourth evaporative cooling system (200) having a fourth heat exchange element (202), a fourth fluid pump (204) and a fourth cooling tower (206). As described previously, the systems may be employed selectively and sequentially to meet varying cooling demands and in response to varying ambient conditions. As more heat exchange elements are employed in the flow path of the air (A), it may be necessary to utilize a larger fan, or to use more fans to physically force the air through the heat exchange elements.

The systems of the present invention may also be used in an embodiment wherein rather then being disposed in the incoming air supply, the heat exchange element is disposed within the interior of the building. In such systems the heat exchange element may comprise any suitable type that would be utilized by one skilled in the art for cooling, including but not limited to, a radiator, a chilled slab, a chilled ceiling panel or a chilled beam. These types of heat exchangers cool the interior of the building by a combination of conductive, convective and radiant cooling. They can be passive in nature not employing any type of fan or draft system, or active incorporating fans or draft systems to actively draw in and move air across the surface of the heat exchange element. The system may be connected to one such heat exchange element, or to a plurality disposed at varying locales within the building.

While the embodiments described above, are directed to cooling air, it can be understood that the heat exchange elements of the system (10) may be used to cool any suitable substance that needs cooling by placing the substance in physical contact with the heat exchange elements. Thus, the present invention would have equal application in industrial processes requiring the cooling of some process substance.

As will be apparent to those skilled in the art, various modifications, adaptations and variations of the foregoing specific disclosure can be made without departing from the scope of the invention claimed herein.

What is claimed is:

1. A system for cooling a primary air supply comprising:
    (a) a first evaporative cooling system comprising;
        (i) means for circulating fluid through the first system;
        (ii) a primary heat exchange element and a primary cooling tower, the primary cooling tower having a second air supply and being operatively connected to the primary heat exchange element;
    (b) means for selectively forcing the primary air supply over the primary heat exchange element;
    (c) a second separate evaporative cooling system comprising;
        (i) means for circulating fluid through the second system;
        (ii) a second heat exchange element and a second cooling tower, the second cooling tower having a third air supply and being operatively connected to the second heat exchange element; and
    (d) means for selectively forcing the second air supply to the primary cooling tower over the second heat exchange element such that the second air supply to the primary cooling tower has a lower wet bulb temperature than the ambient air;
        and wherein each of the first and second evaporative cooling systems has a closed circulatory fluid circuit.

2. The system of claim 1 wherein the means for selectively forcing the primary air supply over the primary heat exchange element comprises a duct and at least one fan.

3. The system of claim 2 further comprising at least one bypass louver.

4. The system of claim 1 wherein the means for selectively forcing the second air supply to the primary cooling tower over the second heat exchange element comprises a duct and at least one fan.

5. The system of claim 1 wherein the means for circulating fluid through the first system and the means for circulating fluid through the second system comprises at least one fluid pump.

6. The system of claim 1 wherein the primary and second heat exchange elements comprise finned cooling coils.

7. The system of claim 1 further comprising an additional heat exchange element proximate to the primary heat exchange element, the additional heat exchange element being connected to a conventional chiller.

8. The system of claim 1 further comprising an additional heat exchange element proximate to the primary heat exchange element, the additional heat exchange element comprising an evaporator of a DX system.

9. The system of claim 1 further comprising:
    (a) a third separate evaporative cooling system comprising;
        (i) means for circulating fluid through the third system;
        (ii) a third heat exchange element and a third cooling tower, the third cooling tower having a fourth air supply and being operatively connected to the third heat exchange element; and
    (b) means for selectively forcing the third air supply to the second cooling tower over the third heat exchange element such that the third air supply to the second cooling tower has a lower wet bulb temperature than the ambient air;
        and wherein the third system has a closed circulatory fluid circuit.

10. The system of claim 1 further comprising means for activating and deactivating each cooling tower and means for circulating fluid.

11. The system of claim 10 wherein the activation and deactivation means is automated and is responsive to:
    (a) changes in cooling requirements;
    (b) ambient air temperature; or
    (c) changes in cooling requirements and ambient air temperature.

12. The system of claim 1 further comprises:
    (a) a third evaporative cooling system comprising;
        (i) means for circulating fluid through the third system;
        (ii) a third heat exchange element and a third cooling tower, the third cooling tower having a fourth air supply and being operatively connected to the third heat exchange element;
    (b) means for selectively forcing the primary air supply over the third heat exchange element;
    (c) a fourth evaporative cooling system comprising;
        (i) means for circulating fluid through the fourth system;
        (ii) a fourth heat exchange element and a fourth cooling tower, the fourth cooling tower having a fifth air supply and being operatively connected to the fourth heat exchange element; and
    (d) means for selectively forcing the fourth air supply to the third cooling tower over the fourth heat exchange element such that the fourth air supply to the third cooling tower has a lower wet bulb temperature than the ambient air.

13. The system of claim 12 further comprising an additional heat exchange element proximate to the primary heat exchange element, the additional heat exchange element being connected to a conventional chiller.

14. The system of claim 12 further comprising an additional heat exchange element proximate to the primary heat exchange element, the additional heat exchange element comprising the evaporator of a DX system.

* * * * *